Patented Nov. 4, 1924.

1,514,573

UNITED STATES PATENT OFFICE.

HORACE A. SHONLE, OF INDIANAPOLIS, INDIANA, ASSIGNOR TO THE ELI LILLY & COMPANY, OF INDIANAPOLIS, INDIANA, A CORPORATION OF INDIANA.

ISOAMYL ETHYL BARBITURIC ACID.

No Drawing. Application filed March 21, 1921. Serial No. 454,150.

*To all whom it may concern:*

Be it known that I, HORACE A. SHONLE, a citizen of the United States, residing at Indianapolis, in the county of Marion and State of Indiana, have invented a new and useful Isoamyl Ethyl Barbituric Acid, of which the following is a specification.

My invention has for its object the obtaining of a substance which possesses marked hypnotic activity combined with low toxicity, and relates to the production of the hitherto unknown hypnotic substance, isoamyl ethyl barbituric acid or isoamyl ethyl malonyl urea.

Isoamyl ethyl barbituric acid exhibits pronounced soporific or hypnotic properties, and at the same time has such a low toxicity that the ratio of the toxic dose to the effective hypnotic dose is much greater than in the case of any of the previously known hypnotics of a similar character, thus affording a greater factor of safety. This factor of safety is even greater than in the case of isobutyl ethyl barbituric acid, for which I have filed an application for a Patent Serial No. 454,149, of even filing date herewith. This isoamyl ethyl barbituric acid causes no ataxia but produces a quiet sleep with no disagreeable after effects.

The new isoamyl ethyl barbituric acid possesses the structure

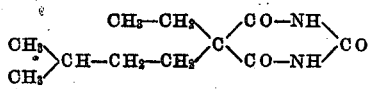

in which one of the hydrogen atoms attached to a nitrogen atom can be replaced by a monovalent metal, such, for instance, as sodium, or by an equivalent of a polyvalent metal, such, for instance, as calcium.

The new isoamyl ethyl barbituric acid may be produced by various processes. One of these consists in condensing urea with isoamyl ethyl malonic ester in the presence of sodium ethylate, using substantially the following quantities, temperatures, and periods of time, although the product may still be obtained in varying yields even if these factors are changed:—

26.7 grams (3 moles) of metallic sodium are dissolved in 500 grams of absolute alcohol, to which are added 100 grams (1 mole) of isoamyl ethyl malonic ester and 37.2 grams (1.6 mole) of urea. This mixture is heated in an enameled autoclave for 4 to 6 hours at a temperature of about 105° C. The isoamyl ethyl barbituric acid formed by this condensation is present as its sodium salt. The mixture is then acidified with hydrocholoric acid and the alcohol removed by distillation. The crude isoamyl ethyl barbituric acid remains as a residue in the distilling flask.

This crude isoamyl ethyl barbituric acid upon re-crystallization from water is obtained in the form of white crystals, which melt at 153–155° C. The re-crystallized substance is slightly soluble in cold water, more soluble in hot water, and easily soluble in alcohol and ether, and has a slightly bitter taste.

Since isoamyl ethyl barbituric acid possesses one nitrogen-linked hydrogen capable of being replaced with a monovalent metal, such as sodium, or with an equivalent of a polyvalent metal, it is possible to form metallic salts of this acid. The acid and the metallic salts may be represented by the following formula:

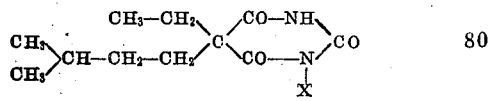

in which X represents either a hydrogen atom or an atom of a monovalent metal or an equivalent of a polyvalent metal. The sodium salt, which may be formed by treating one mole of isoamyl ethyl barbituric acid with one mole of sodium hydroxide in a suitable solvent, is readily soluble in cold water, and somewhat less soluble in absolute alcohol. The soluble salts are of value for hypodermic injection.

I claim as my invention:

1. The new substances, which may be represented by the formula:

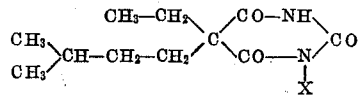

wherein X represents either a hydrogen atom, an atom of a monovalent metal, or an equivalent of a polyvalent metal.

2. The new substance, isoamyl ethyl barbituric acid, being a compound displaying a hypnotic action, crystallizing from water in the form of white crystals melting at 153–

155° C., being slightly soluble in cold water, more soluble in hot water, easily soluble in alcohol and ether, having a slightly bitter taste, and forming with the alkali metals salts which are readily soluble in water.

3. The new substances, which contain the radicle which may be represented by the formula:

$$\begin{array}{c}CH_3-CH_2\\CH_3\\CH_3\end{array}\!\!>\!\!CH-CH_2-CH_2\!\!>\!\!C\!\!<\!\!\begin{array}{c}CO-NH\\CO---N\\|\end{array}\!\!>\!\!CO$$

4. As a new product isoamyl ethyl barbituric acid having the formula:

$$\begin{array}{c}CH_3-CH_2\\CH_3\\CH_3\end{array}\!\!>\!\!CH-CH_2-CH_2\!\!>\!\!C\!\!<\!\!\begin{array}{c}CO-NH\\CO-NH\end{array}\!\!>\!\!CO$$

In witness whereof, I have hereunto set my hand at Indianapolis, Indiana, this 17th day of March, A. D. one thousand nine hundred and twenty one.

HORACE A. SHONLE.